United States Patent Office 3,270,797
Patented Sept. 6, 1966

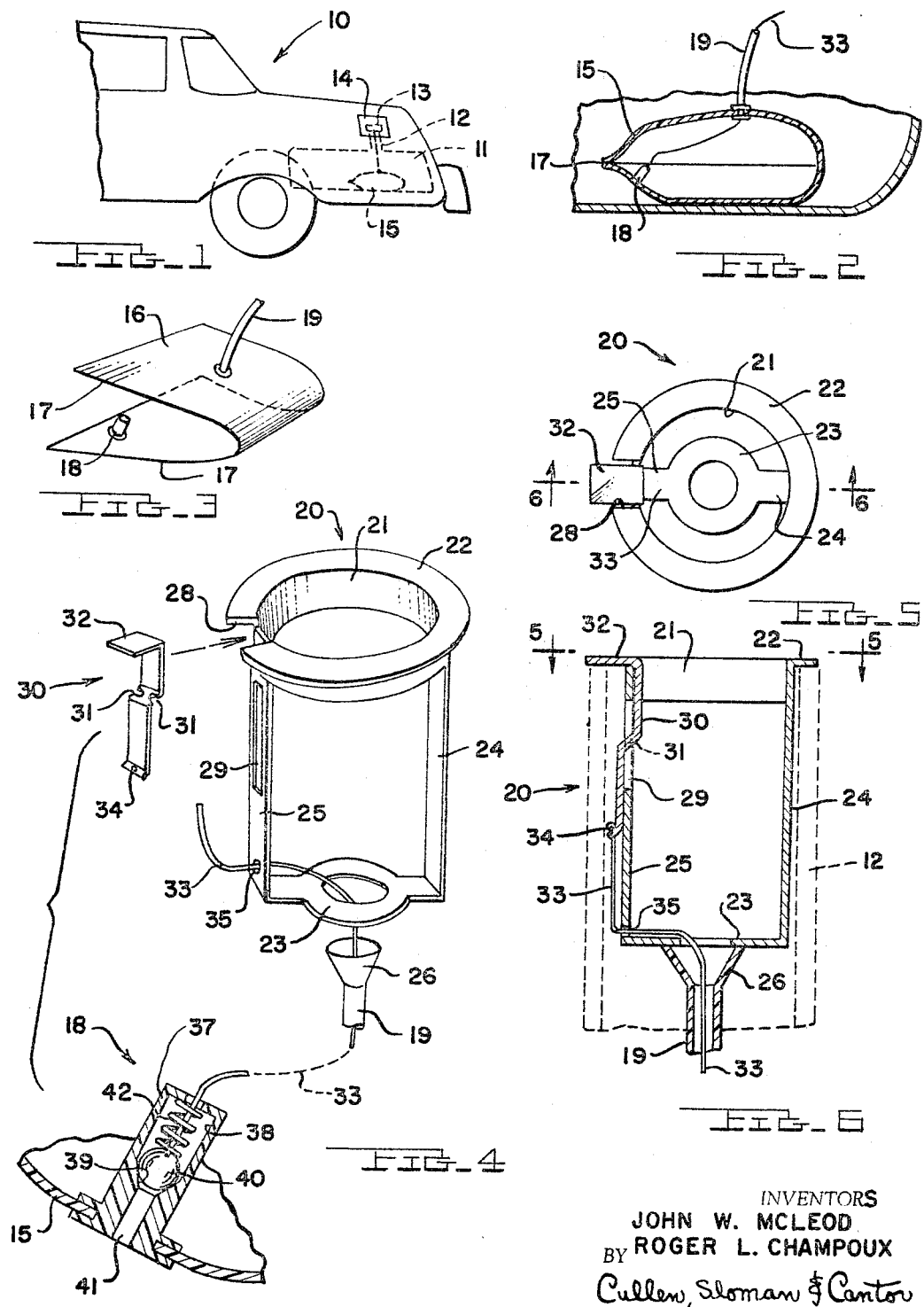

3,270,797
EMERGENCY FUEL CONTAINER FOR
AUTOMOTIVE VEHICLES
John W. McLeod, 1300 Lafayette E., Detroit, Mich., and
Roger L. Champoux, 31102 Schoolcraft, Livonia, Mich.
Filed Aug. 7, 1964, Ser. No. 388,239
2 Claims. (Cl. 158—46.5)

This invention relates to an emergency fuel container for automotive vehicles and, more particularly, to a container adapted to be inserted and carried within the standard fuel tank of a vehicle and adapted to hold a small, emergency supply of fuel.

It is an object of this invention to provide a bag-like container adapted to be inserted and mounted within a conventional, automotive vehicle fuel tank to hold a small amount of fuel separately from the fuel otherwise within the tank, so that should the tank become empty and the vehicle thereby stopped, the motorist can release the emergency supply of fuel and thus, make available sufficient fuel to travel a short distance to a gasoline station. This insures the motorist that despite running out of fuel, he will have a small emergency quantity available, stored within his own fuel tank.

Another object of this invention is to form an emergency fuel container connected within the standard fuel tank by means of a bracket which functions to support a filler tube in such a way that the emergency tank will be filled automatically, each time the vehicle is refueled, and in addition functions to partially block off the entrance into the fuel tank to thereby prevent theft of the fuel therein. In addition, such bracket provides a means, along with a valve and pullcord for manually releasing the fuel from the container.

These and other objects and advantages of this invention will become apparent upon reading the following description, of which the attached drawings form a part.

In these drawings:

FIG. 1 is a schematic, fragmentary view of an automobile and its fuel tank with the emergency fuel container.

FIG. 2 is a cross-sectional view of the emergency fuel container and a portion of a conventional fuel tank.

FIG. 3 shows the emergency fuel container prior to assembly thereof.

FIG. 4 is a perspective, exploded view of the bracket and valve assembly.

FIG. 5 is a top plane view of the bracket taken in the direction of arrows 5—5 of FIG. 6.

FIG. 6 is a cross-sectional view of the bracket taken in the direction of arrows 6—6 of FIG. 5.

FIG. 1 illustrates a conventional automobile 10, having a conventional fuel tank 11, formed of sheet metal, and having an upper, elongated, filler neck or nozzle 12 covered by a cap 13, located beneath a fender door 14. To fill the tank, the door is opened, cap 13 is removed, and the nozzle of a gasoline pump hose is inserted into the filler neck.

The invention herein relates to the emergency fuel container 15, which is located within the tank 11, and is formed of a flexible, plastic sheet 16, of a type which is impervious to automotive fuels. Preferably it is formed of a single sheet, folded in half and having its edges 17 joined together by heat welding or the like. The bag-like container is provided with a normally closed valve 18, which opens between the interior of the container and the interior of the tank. Also, the container is provided with a flexible, elongated filler tube 19 whose lower end is fastened to and opens into the container.

The upper end of tube 19 is supported by a bracket 20, which is formed of a cylindrically shaped upper ring 21 having an integral upper flange 22. The ring is of a size to snugly fit into and to be frictionally held within the upper end of the filler neck 12 with flange 22 rested upon the upper edge of said neck (see FIG. 6). Spaced beneath the upper ring is a lower ring 23 integrally connected to the upper ring 21 by means of rigid, vertically arranged strips 24 and 25.

The upper end 26 of tube 19 is flared and is connected in any suitable manner to the lower ring 23 so that fuel may pass through the center of the ring into the filler tube 19.

The flange 22 is notched at 28 and a vertically elongated slot 29 is formed in the strip 25 to receive and guide a slider member 30. The slider member is formed of a rigid, elongated strip whose upper end is bent into a handle portion 32, which is normally arranged coplanar with flange 22, and whose lower end portion is bent and notched at 31 for fitting through the slot 29 (see FIG. 6) with the notches receiving the edges forming the slot 29 and thus guiding the slider member sliding up and down.

A flexible cord 33 is attached to the slider member through an opening 34 formed in its portion 31, and passes through opening 35 in strip 25 and then through the center of ring 23 and down through the filler tube 19 into the container for connection to the valve 18.

This valve includes a barrel portion 37 having a central bore 38 formed with an interior seat 39 against which a ball 40 is seated. The lower end of cord 33 is connected to ball 40 so that a pull upon the cord 33 will unseat the ball and permit fuel to flow from the container into the tank through bore 38 and opening 41 formed in the wall of the container.

The ball normally is held in its seated position by a spring 42 to keep the valve normally closed and the valve is opened only during the time that the cord 33 is manually pulled.

In operation, the flexible container 15 is rolled up and inserted into the fuel tank through filler neck 12 and is allowed to drop to the tank bottom. Then, bracket 20 is positioned in the upper end of the filler neck, thus automatically positioning the upper end 26 of the filler tube 19 at a distance below the upper edge of the filler neck, but opening upwardly. When fuel is poured into the tank, part of the fuel will automatically enter the filler tube 19 to fill up the container. The cap 13 then closes the filler neck in the usual way.

Normally, the fuel within the emergency container is unused since the valve 18 is closed. However, if and when the tank runs out of fuel, the motorist can open the cap 13 and then by grasping the handle 32 of slide member 30 and pulling it upwardly, the cord 33 will unseat ball 40 and permit fuel to run through the valve, out of the container and into the fuel tank, thus providing an emergency supply of fuel.

When the slide member is released, spring 42 will automatically seat the ball to close the valve.

In addition, the lower support ring 23 partially blocks the filler neck 12 to prevent unauthorized access into the fuel tank, thereby serving as an anti-theft device.

This invention may be further developed within the scope of the following claims. Accordingly, it is desired that the foregoing description should be read as being merely illustrative of an operative embodiment of this invention and not in a strictly limited sense.

We now claim:

1. An emergency fuel container for a vehicle fuel tank having a narrow filler neck comprising a bag-like container, formed of a thick, flexible fuel-impervious sheet material, of a size considerably smaller than said tank but normally larger than the filler neck thereof, for insertion into said tank through said neck; a tube having a narrow end opening into said container and an upper end arranged for opening into said tank filler neck for receiving fuel when the tank is normally refueled; a bracket comprising an upper ring snugly fitted into and frictionally held within the upper end of said filler neck, a lower ring spaced below said upper end and centered in the filler neck, means rigidly interconnecting the two rings, and the upper end of said tube being connected to said lower ring in an upwardly opening position; said bracket further including a slider member, slidably secured to the bracket between the rings and having an upper end arranged at the upper ring, said slider member being arranged for sliding upwardly and downwardly relative to the filler neck; a normally closed valve formed in said container for communicating the interior of the container with the interior of the tank; and a cord connected to the valve for opening same when the cord is pulled, the upper end of said cord being secured to the lower end of said slider member, wherein manually caused upward sliding of said slider member will pull said cord for opening said valve, thereby permitting fuel within the container to flow through the valve into said tank.

2. The emergency fuel container of claim 1, wherein said lower ring partially blocks said filler neck, and wherein said rings are connected by a pair of elongated, rigid strips, and wherein said slider member is slidably connected to one of said strips.

References Cited by the Examiner

UNITED STATES PATENTS

| | | | |
|---|---|---|---|
| 2,644,514 | 7/1953 | Potter | 158—46.5 |
| 2,971,576 | 2/1961 | Anker | 158—46.5 |

FOREIGN PATENTS 37,772 8/1927 Denmark.

FREDERICK KETTERER, *Primary Examiner.*